Figures 1, 2:
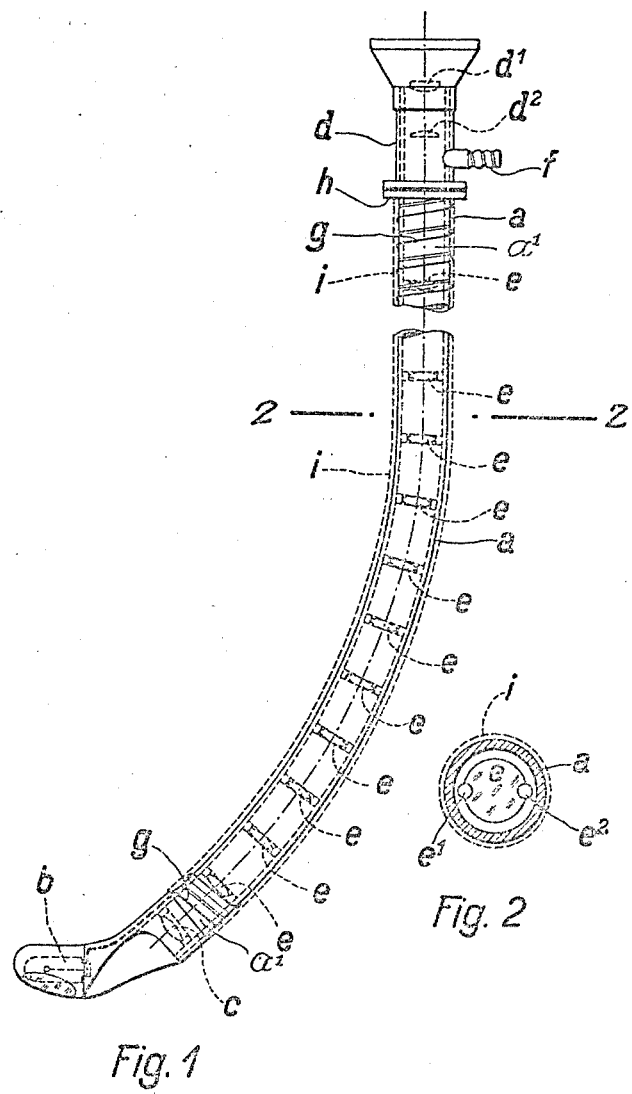

June 27, 1933. G. WOLF 1,915,811
INSTRUMENT FOR EXAMINING TUBES AND CAVITIES IN THE HUMAN AND OTHER BODIES
Filed July 8, 1931

Inventor:
Georg Wolf

Patented June 27, 1933

1,915,811

UNITED STATES PATENT OFFICE

GEORG WOLF, OF BERLIN, GERMANY, ASSIGNOR TO THE FIRM GEORG WOLF G. M. B. H., OF BERLIN, GERMANY

INSTRUMENT FOR EXAMINING TUBES AND CAVITIES IN THE HUMAN AND OTHER BODIES

Application filed July 8, 1931, Serial No. 549,369, and in Germany July 12, 1930.

With a view to facilitate the introduction of instruments for examining the interior of tubes and cavities in the human and other bodies, it has been suggested to use for instance an instrument the shank of which consists of a plurality of single members interconnected by joints permitting it to adapt itself to the curvature of the hollow organ. However, when an examination should be effected, the said shank must be bent straight, which requires the hollow organ to be sufficiently flexible and has the disadvantage that during the said introduction an examination is not possible. Moreover, an instrument of this kind necessarily has a construction which is by no means practical. Later on another suggestion has been made, namely to provide an instrument having between ocular and objective a great number of rectangular prisms all of which are interconnected in a special manner and can be given different mutual positions by two cords arranged outside so that the shank can be curved. In order to be protected toward outside the prisms are enveloped in a rubber hose. Although affording an examination during the introduction, also this instrument is nevertheless comparatively unwieldy.

The invention provides a specially simple instrument which, like the one mentioned last, allows to effect an examination during the introduction. The optical parts of this instrument are held in position by a flexible metal tube which contains also a great number of converging lenses for the transmission of the imaging rays. These lenses are arranged at short intervals over the entire length of this tube. It has proved that in this simple manner a sufficiently good quality of images can be obtained also when the tube is curved.

With an instrument of this kind the supply of current to the glow lamp in the end to be introduced gives rise to certain difficulties which are due to the necessity of the electric conductors adapting themselves to the curvature of the tube. These difficulties can be easily overcome by making one of the conductors go in helical windings around the exterior surface of the tube, while the other may be provided by the tube itself.

The accompanying drawing shows a constructional example of a gastroscope according to the invention. Figure 1 is a view of this instrument and Figure 2 a cross section along line 2—2 in Figure 1.

The gastroscope has a flexible metal tube $a$ in the one end of which, the end to be introduced, is provided a glow lamp $b$ having behind it an objective $c$. In the other end of the tube $a$ is provided an ocular $d$ of two lenses $d^1$ and $d^2$. The tube $a$, which consists of a helically wound band $a^1$ of German silver being 0.4 millimeter thick and 5 millimeters broad, contains between the objective $c$ and the ocular $d$ a plurality of converging lenses $e$. As is seen in Figure 2, the lenses as well as their mounts have holes $e^1$ and $e^2$ which pass a current of air that may be blown through the whole tube by means of a hose to be connected to a socket $f$ fixed to the ocular part. On the surface of the metal tube $a$ is wound an insulated electric conductor $g$ the two ends of which are connected to a contact disc $h$ and to the cap of the glow lamp $b$, respectively. For the sake of clearness the conductor $g$ and the surface of the tube $a$ are shown only partly in the drawing. The tube $a$ and the conductor $g$ can be enveloped in a rubber hose $i$.

I claim:

1. An instrument for examining the interior of tubes and cavities in the human and other bodies comprising a flexible metal tube, an objective provided in the front end of the metal tube, an ocular disposed in the rear end of the metal tube, and a comparatively great number of converging lenses disposed at short intervals between the objective and the ocular.

2. In an instrument according to claim 1, a glow lamp disposed in the front end of the metal tube and in front of the objective, and a current conductor connected to the glow lamp and being wound in a helical manner around the exterior surface of the metal tube.

GEORG WOLF.